(12) United States Patent
Fernandez et al.

(10) Patent No.: US 7,965,772 B2
(45) Date of Patent: Jun. 21, 2011

(54) SYSTEMS AND METHODS FOR IMPROVED DATA TRANSMISSION

(75) Inventors: Gregory Alan Fernandez, Huntington Beach, CA (US); Brian R. Bergantz, San Jose, CA (US)

(73) Assignee: Saratoga Technology Group, Inc., Los Gatos, CA (US)

( * ) Notice: Subject to any disclaimer, the term of this patent is extended or adjusted under 35 U.S.C. 154(b) by 1427 days.

(21) Appl. No.: 11/441,736

(22) Filed: May 25, 2006

(65) Prior Publication Data

US 2006/0274831 A1 Dec. 7, 2006

(51) Int. Cl.
*H04N 7/12* (2006.01)
*H04N 11/02* (2006.01)

(52) U.S. Cl. .............................. 375/240.15; 375/240.01

(58) Field of Classification Search .................. 348/403, 348/415, 416, 407, 394, 408, 421, 418, 420, 348/405, 592, 587; 382/56, 232, 236, 238; 375/240.12, 240.01, 240.26, 240.25, 240.15
See application file for complete search history.

(56) References Cited

U.S. PATENT DOCUMENTS

| 5,442,390 | A | * | 8/1995 | Hooper et al. | ................... 725/90 |
| 5,459,518 | A | | 10/1995 | Wickstrom et al. | |
| 5,509,089 | A | | 4/1996 | Ghoshal | |
| 5,778,190 | A | | 7/1998 | Agarwal | |
| 6,300,936 | B1 | * | 10/2001 | Braun et al. | ................... 345/156 |
| 6,381,276 | B1 | | 4/2002 | Pesquet-Popescu | |
| 2007/0160142 | A1 | * | 7/2007 | Abrams | ................... 375/240.12 |

* cited by examiner

*Primary Examiner* — Behrooz Senfi
(74) *Attorney, Agent, or Firm* — Crowell & Moring LLP

(57) ABSTRACT

Real-time video content is segmented into a series of processing cubes that are comprised of a predetermined number of frames, wherein the first frame is a reference frame, followed by a plurality of delta frames. In one embodiment, the video data which defines the reference frame is converted into command-and-control data usable to re-create the reference frame at a destination location. For the delta frames, only that data which is actually different than the preceding frame is transmitted and used to re-create corresponding frames at the destination location.

24 Claims, 5 Drawing Sheets

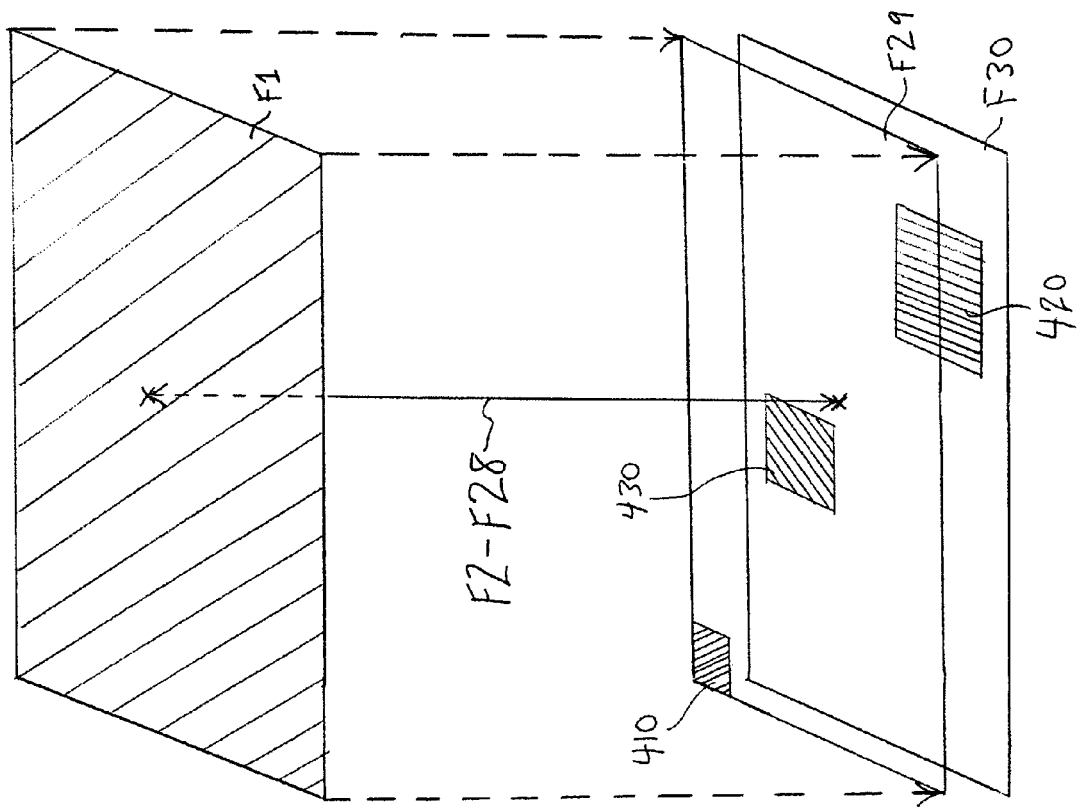

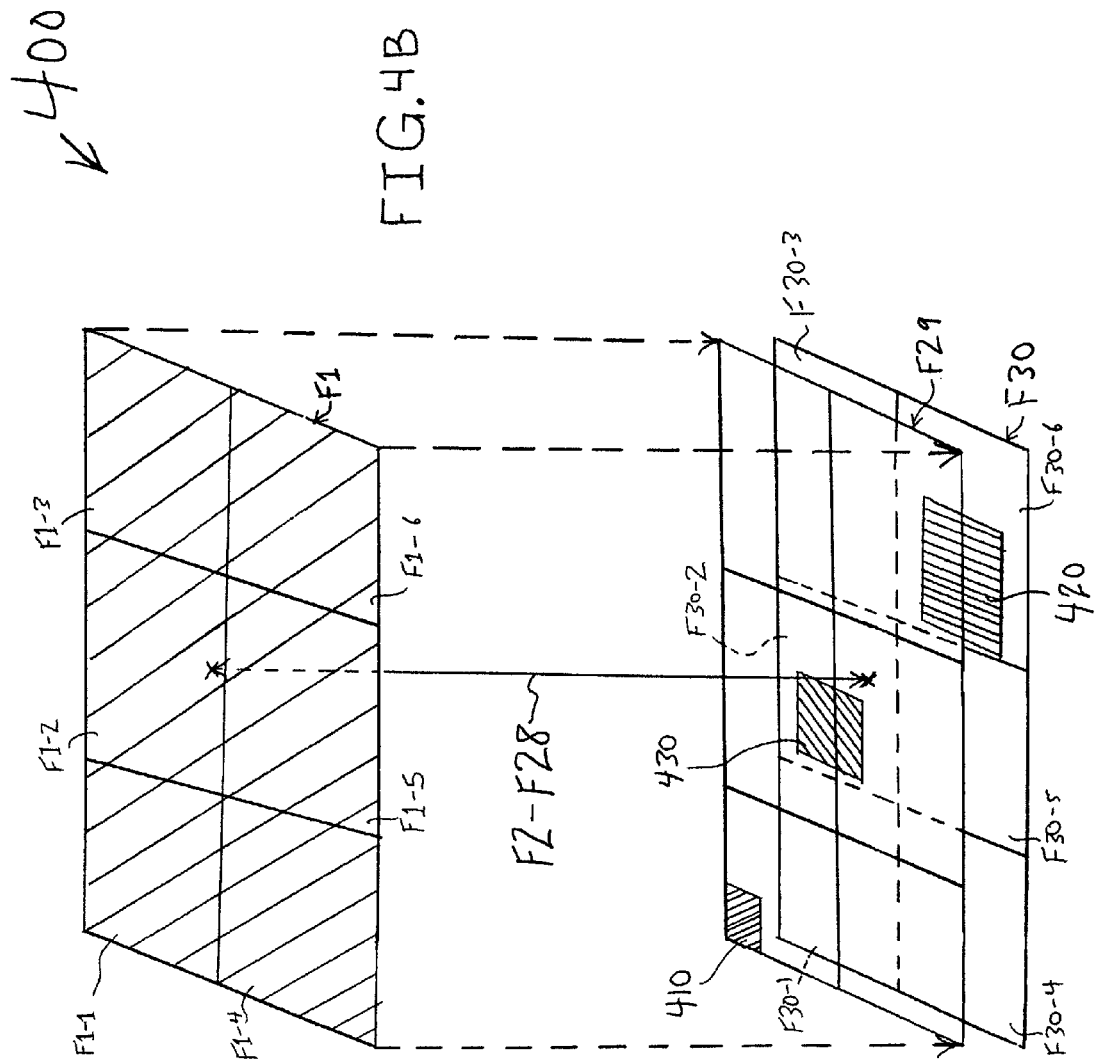

SYSTEMS AND METHODS FOR IMPROVED DATA TRANSMISSION

CROSS-REFERENCE TO RELATED APPLICATION

This application is related to and claims priority from the U.S. provisional patent application having application No. 60/686,231, filed on May 31, 2005.

FIELD OF THE INVENTION

This invention relates generally to data transmission, and in particular to an improved system and method for processing video data for transmission over a network connection.

BACKGROUND

Video data is typically presented as an array of pixels on a display device. The number of pixels per inch (PPI) is a typical measurement of how a display device displays an image. The resolution of an image displayed on a display device is determined by its PPI, or the number of pixels contained within one square inch of monitor space. While image resolutions vary dramatically depending on the quality of the display device being used and the quality of the video signal being received, a typical pixel array may be 1024 pixels across by 1024 pixels down, for a total pixel array of 1 million pixels. In addition to the number of pixels being display, the number of bits used to define particular pixel characteristics (e.g., color, intensity, etc.) can vary, thereby varying the level of detail. In short, a large amount of data, and hence bandwidth, is needed to stream video over a network while maintaining a reasonable degree of quality. For example, in the case of NTSC standard broadcasts, video transmission requires that approximately 1.2 mbs of data be streamed per second over the network in question.

Streaming video involves the transmission of the video file as it is being created, in which there is a continuous presentation of the video and sound at the receiving point. In the context of video content transmission over a network, for example the Internet, there are inherent limitations in the amount of content that can be accurately and/or safely sent. For example, a 28.8-kbps modem has a throughput capacity of about 3.6K per second, which is approximately 1/40 the speed of the ancient CD-ROM drive. Moreover, the Internet is notoriously unpredictable when it comes to transmission performance. Heavy traffic load and internal transmission problems can cause delays that are beyond control. This can result in interruptions, delays and/or poor video reproduction at the destination device.

When attempting to transfer live video, the bandwidth problem becomes much more critical. To transfer voice through modems, a compression factor of between 25 to 50 is typically needed. However, when transferring video via a modem connection, a content compression ratio on the order of between 2500 to 5000 is typically needed. There is currently no known compression that will achieve this target. Thus, there is a need for an improved system and method for transmitting video, and a particular need for transmitting video in a more efficient manner which would require lower bandwidth and/or increase transmission speed and quality.

BRIEF SUMMARY OF THE INVENTION

Systems and methods for improving data transmission are disclosed. In one embodiment, a method for encoding video data includes defining a processing cube having a predetermined number of video frames of video data, encoding a reference frame of the processing cube by converting video data representative of the reference frame into command data, and performing differential pixel analysis between two or more frames of the processing cube. The method further includes encoding a plurality of delta frames based on the differential pixel analysis.

Other aspects, features, and techniques of the invention will be apparent to one skilled in the relevant art in view of the following detailed description of the invention.

BRIEF DESCRIPTION OF THE DRAWINGS

FIGS. 4A-4B depict embodiments of a processing cube of video data.

DETAILED DESCRIPTION OF THE EXEMPLARY EMBODIMENTS

Figure 1:
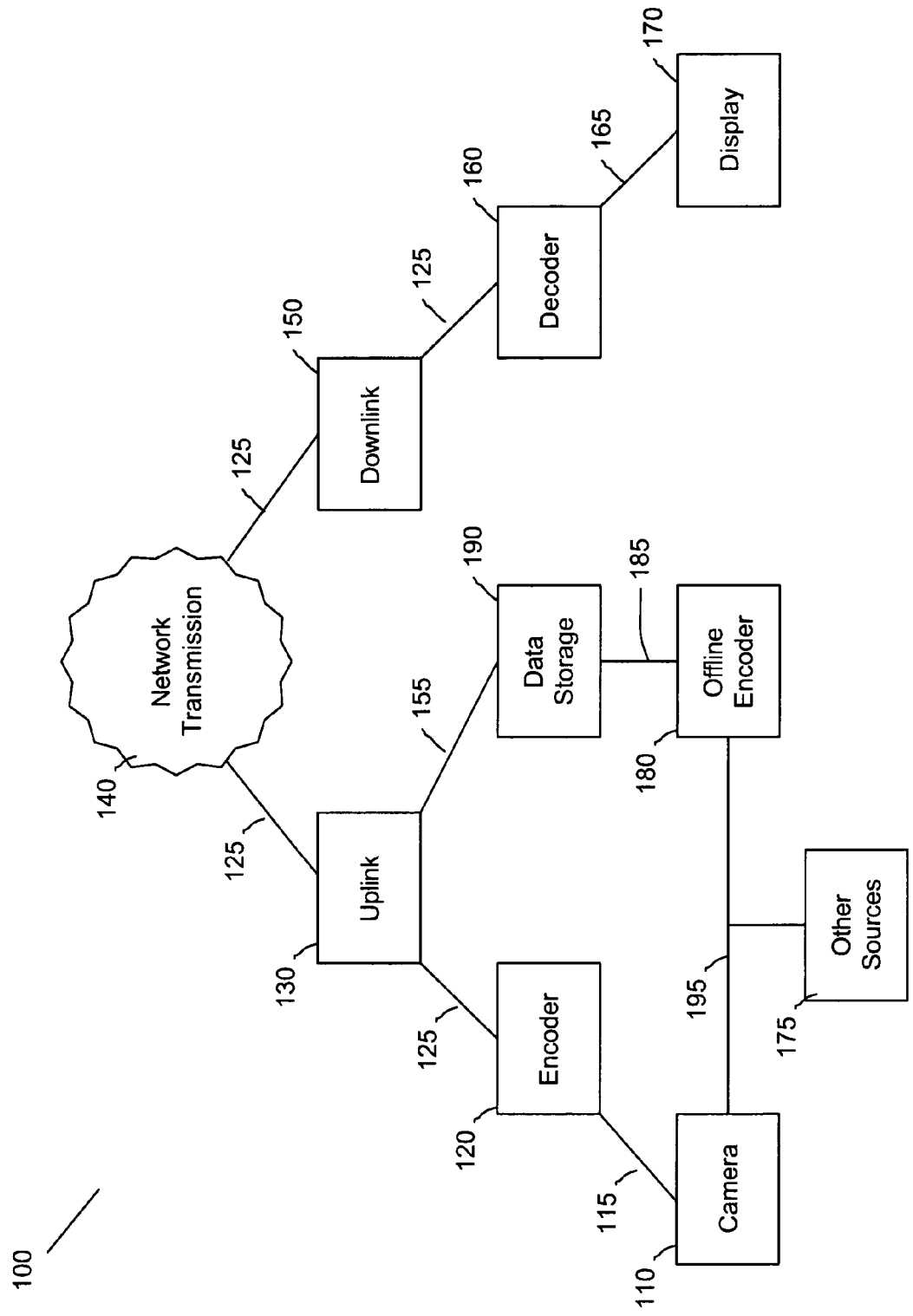
FIG. 1 depicts one embodiment of a simplified system overview for implementing one or more aspects of the invention.

Disclosed herein are systems and methods for improving the data transmission of video content. In particular, the disclosure relates to an improved system and method for transmitting video data in a more efficient manner by using a command-and-control approach to delivering video information. In one embodiment, the improved approach disclosed herein improves video transmission efficiency by at least 6 times over MPEG-2 compression technology. In another embodiment, the systems and methods described herein reduce processing overhead and transmit video information in a more efficient manner, thereby freeing up additional bandwidth and/or improving video quality and transmission speed.

The aforementioned improvements may be realized, at least in part, by use of a differential pixel analysis to process video frame data. Differential pixel analysis is the idea of processing pixel information for a particular frame in both spatial terms, as well as temporal terms.

Another aspect of the invention is to segment real-time video content into a series of processing cubes that are comprised of a predetermined number of frames, wherein the first frame is a reference frame, followed by a plurality of delta frames. In one embodiment, the video data which defines the reference frame is converted into command-and-control data usable to re-create the reference frame at a destination location. For the delta frames, only that data which is actually different than the preceding frame is transmitted and used to re-create corresponding frames at the destination location.

Still another aspect of the invention is to divide a given reference frame into a number of manageable zones in order to increase efficiency of subsequent processing. Such zones may or may not receive different processing treatment, depending on the nature of the content or activity level within the zones.

In addition, reference frames may be further processed by dividing them up into relatively large uniform blocks, or Areas of Responsibility (AORs). Rather than attempting to encode the pixel information on a per-pixel basis, a block of numerous pixels all having the same color can be encoded together. Such AORs may take the form of fill, vector or pixel-level blocks, as described in more detail below. Numerous other aspects, features, embodiments and the like will be described in detail below.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

System Architecture Overview

FIG. 1 depicts one embodiment of a system 100 for carrying out one or more aspects of the invention. In particular, system 100 includes the real-time capture of video content using camera 110. This video content 115 may then be provided to either an offline encoder 180 over connection 195, or to a real-time encoder 120 that processes the video content 115 from camera 110 to produce corresponding video-related data 125. In addition, other video sources 175 may similarly be used to provide captured video content. As will be described in more detail below, in one embodiment encoder 120 parses the video content 115 to generate command-and-control data, i.e., video-related data 125, that is usable to re-create the video content 115 in real-time at a destination point after transmission over a network (e.g., Network 140). In one embodiment, encoder 120 is comprised of both software and hardware components.

Continuing to refer to FIG. 1, encoder 120 provides the video-related data 125 to the uplink 130 (e.g., a net-node on the Internet), which would then be able to transmit the video-related data 125 over a network 140 (e.g., the Internet) to a destination node (i.e., downlink 150). While in one embodiment the downlink 150 may be coupled to a single decoder 160, it should equally be appreciated that the downlink 150 may provide the video-related data 125 to a plurality of decoders (not shown). In any event, once the video-related data 125 has been decoded by decoder 160, it may be sent to one or more display devices 170 for offset real-time viewing of video content 115. As will be described in more detail below, in one embodiment decoder 160 parses video-related data 125 to re-create video content 115 as video content 165.

In addition to the real-time capture of video content 115, non-real-time video content 185 may be encoded using offline encoder 180, as shown in FIG. 1. While it may be preferable to implement the offline encoder 180 using software only, it may similarly be implemented using a combination of software and hardware. As with the encoder 120, the offline encoder 180 may be used to parse the non-real-time video content 185 to generate a set of command-and-control data. That is, once encoded, the non-real-time video-related data 185 can be stored on data storage 190 for later transfer using connection 155 to uplink 130, and on to downlink 150 over network 140. In one embodiment, the non-real-time video-related data 185 can be accessed in a real-time viewable manner directly from data storage 190.

It should equally be appreciated that uplink 130 need not be structurally separate from encoder 120, and that decoder 150 need not be structurally separate from decoder 160. Since most of the image processing is done on the encoder side, the decoder may be no more than a 233 MHz Pentium System computer, although it should be appreciated that any other computing system capable of decoding the command-and-control information received from the encoder may be used.

Continuing to refer to FIG. 1, video content can be either intended for real-time consumption or for non-real-time playback. In the case of real-time content transmission, there will be an initial latency period due to the fact that a full processing block of frames are captured and processed together before transmission. However, after this initial latency period the remainder of the video presentation will be in real-time, albeit offset by the initial latency period.

To achieve the real-time transmission of video content, in one embodiment the encoder 120 employs a double buffering architecture in which a first block of frames are captured in one of the memory buffers. Once captured, this block of frames may be processed by the encoder. However, simultaneous with the processing of the block of frames in the first memory buffer is the capture of a second block of frames in the second memory buffer. In one embodiment, by the time the second block of frames has been captured in the second buffer, the first block has been processed and transferred out of the encoder for transmission on to a destination location. In this fashion, the processing of the incoming video content can ping-pong back and forth in the double-buffer structure of the encoder.

Due to the parallel processing requirements of the above embodiment, it may be desirable to implement the real-time encoder 120 as a combination of hardware and software. To that end, an array of computers and an array of parallel-independent memory supporting each computer may be used to distribute tasking associated with the encoding process amongst these computers in such a manner that the overall encoding process proceeds in a parallel fashion to arrive at a solution point at roughly the same time. Moreover, due to the nature of parallel processing, a typical multi-processor arrangement which reassigns dormant resources may not be practical for implementing one or more embodiments of the invention. Rather than recovering the latency of a dormant computer, in one embodiment dormant portions of the computer array will be allowed to sit idle so as to allow the targeting of specific asynchronous computing function as opposed to general purpose processing.

In one embodiment, the above structure can be implemented using a multi-instruction, multi-processor, data (MIMPD) structure. That is, multiple processors work in conjunction under a hierarchy of command-and-control to produce a singular effect. In another embodiment, the highest level of processing is implemented by a real-time operating system executing on a main computer of the computer array. The main computer may perform housekeeping function to determine remaining time budgets and possibly make strategic decisions for altering the process to avoid overshooting the time budgets.

The remaining computers in the computer array may be structured into a downstream hierarchy based upon the command-and-control from one or more senior computers. In this way, a top-down hierarchical management of multi-levels of computing may be implemented wherein the bottommost level is maximally parallel. In one embodiment, this top-down computing structure may be implemented by one or more nested field programmable gate array (FPGA) chips, such as the Xilinx or Altera FPGAs. In another embodiment, a plurality of FPGA chips may each be used to logically simulated a plurality of independent processors. In another embodiment, the FPGA chips may be logic programmed to be state machine structures as opposed to full computation ALUs or full computation instruction set computers.

The FPGA chips may execute RISC instruction sets that are targeted for specific functions for the level of responsibility associated with where the chip occurs in the hierarchy. For example, in one embodiment, an instruction set can be tailor-made for the computer responsible for color optimization. That is, the instruction set for intensity optimization can be tailor-made, as well as instruction set for the threshold testing for the choice of which algorithm to employ on the screen dynamically. Similarly, another instruction set can be tailor-made to handle the responsibility for screen partitioning, and to determine which directions the algorithms should be applied. Thus, in one embodiment a large distributed FPGA can be used in which each portion has communications to the other portions of responsibility in a waterfall fashion of dedicated communication buses between the chips specific for the communication that has to go across that line. While in one embodiment, the real-time parallel operating system is similar to "OCCAM," it may similarly be any other operating system capable of carrying out the real-time parallel processing described herein, such as PROLOG, Parallel PASCAL, Celoxica, Ocam, Parallel-C, Parallel-C+, Parallel Haskell, etc.

Differential Pixel Analysis

One aspect of the invention is to use differential pixel analysis to process video frame data. Differential pixel analysis is the idea of processing pixel information for a particular frame in both spatial terms, as well as temporal terms. With respect to spatial processing, a pixel can be processed as a function of its neighboring pixels. To that end, in one embodiment adjacent pixels in the same color spectrum can be processed as a group, rather than as individual pixels. With respect to temporal processing, similarly-located pixels can also be processed as a function of their change across one or more adjacent frames. That is, particular pixel locations can be compared to its successor pixel on a subsequent frame to determine the difference, if any, between the two.

In both the spatial and temporal sense, pixel difference determinations may be based on a predefined threshold to determine if in fact a pixel characteristic has changed or not. This tolerance, or threshold, may be dynamically adjusted depending on the particular video application involved, hardware limitations, or any number of other factors. If the threshold is exceeded, a particular algorithmic response would be triggered. If, on the other hand, the threshold was not exceeded, then there may be a different algorithmic response. In this manner, pixels (or blocks of pixels) can be grouped, or not, as a function of a series of threshold determinations of one or more pixel characteristics (e.g., color, intensity, etc.).

Formation of Processing Cubes

Another aspect of the invention is to segment real-time video content into a series of processing cubes that are comprised of a predetermined number of frames. It should be appreciated that the number of frames in a processing cube may be 16, 32, 64, 96, 128 or some other amount. Regardless of the number of frames in the processing cube, the first frame is referred to as a reference frames, while all of the other frames in the cube may be referred to as delta frames. As will be described in more detail below, the video data which defines the reference frame is converted into command-and-control data usable to re-create the reference frame at a destination location. For the delta frames, however, only those portions of the display screen which are different from the preceding adjacent frames are used to re-create such frames at the destination location.

The entire processing cube may then be used to make a comparison on spatial representations, as well as temporal representations, to generate a composite cubic solution. The cubic solution may then be encoded into an efficient stream of digital data which is not video data any longer, but is rather a digital stream of data which takes the form of command-and-control information. In one embodiment, this data stream may be transmitted as a straight text file over a wireless network without restriction on video format, video timing, etc.

Latency

Traditionally, live coverage of such events would require a camera to pick up the live event, a microwave truck at the live event then takes the results of the camera and microwaves it to the local station, and the local station would then transmit the video to the network, which in turn transmits to all over the world. This sequence of transmissions causes a slight delay in the time between when the actual event occurs to when it is viewed by the end user. In one embodiment, this latency may be prolonged by anywhere from approximately 30 frames to approximately 60 frames, but may be as high as 256 frames. Thirty frames is roughly equivalent to one second of latency, with 60 frames being approximately two seconds, and so on. The reason that some additional latency may be injected into the process is that the encoder processing the video content on a 'processing cube' basis, as previously explained. That is, the entire first block of frames (e.g., 30 frames) is completely captured before any processing begins. In one embodiment, the delay associated with the first frame being viewable at the receiver end can be anywhere from 4 to 8 seconds. During that interval of time, the first 30 or so frames of video are analyzed and processed. Once the initial latency period is set, additional latency is not incurred and the video stream may be a real-time stream from that point forward, albeit offset by the initial latency period.

Reference Frame Processing

Processing of the reference frame is primarily concerned with only spatial representations and computations. Reference frames, which occur every n frames where n equals the number of frames in a processing cube, contain all of the information necessary to provide a complete reference point from which to make delta frames.

One of the several potentially concurrent processing operations is to divide the frame into manageable zones for increasing the efficiency of subsequent processing. Take, for example, a frame which has been divided up into nine zones comprised of three horizontal rows and three vertical rows giving nine individual zones. In this case, the upper left hand corner zone, the middle top zone and the upper right hand corner zone in a typical outside view of a video sequence may be comprised of sky, for example. The middle zone of left, middle, and right would tend to be primarily active content (e.g., actors, actresses, cars, airplanes, etc.) with primarily horizontal motion. Finally, the bottom three zones would tend to include the foreground, such as street level static objects, grass, dirt, etc. Using this illustrative example, one can take the sky zones, which are fairly static and uniform in color, and divide it up into relatively large uniform blocks, which will be referred to hereinafter as fill Areas of Responsibility (AORs). Rather than attempting to encode the sky pixel information on a per-pixel basis, a block of numerous pixels all having the same color can be encoded together, thereby materially reducing the amount of data needed to represent the same given area as if encoded on a per-pixel basis. If the pixel colors of a given block of pixels are threshold tested to be the same (e.g., blue sky), then a substitution can be made in which only one color and one area can be used to encode the entire block. This would amount to a fill operation for the entire block.

Since the middle three zones would tend to be comprised of active content and not static content, the size and/or number of fill AORs would tend to be much lower than the sky zones. However, the lower or ground-level zones would tend to mirror the upper sky zones in that the content will tend to be static with large blocks of uniform color. Thus, in one embodiment the fill AORs for the lower zones may be similarly sized and numbered as the fill AORs of the upper zones. Moreover, the size of the smallest fill AOR may be set such that the resulting fill AORs are manageable in number. This is due to the fact that as you decrease the allowable size of a fill AOR, the number of fill AORs may increase exponentially.

Thus, the first stage of the reference frame processing would be to take broad brush strokes of the entire frame to identify and encode the dominant colors using what is essentially a fill algorithm comprised of a color and an area (e.g., fill AOR) to be filled. However, once this is done, a second stage of analysis will be needed to encode the video data that is left after subtracting out those dominant colors. This second stage of reference frame processing would process the next level of image data as a set of vector oriented blocks. That is, edges of objects (e.g., tree limbs, leaves, building edges, windows, bodies, etc.) may be described in terms of their edges, or vectors. Again, the frame is divided into a number of AORs, which in this case are vector AORs. As with the fill AORs, the number of vector AORs may be a function of achieving a manageable number of vectors. For example, the process may set the size of the vector AORs at the largest size possible to form a predetermined number of vectors within that block. Given that number, the process could then look at the number of color variables and/or intensity variables in that vector AOR and make threshold determinations. In addition to the size, the shape of the vector AORs may be similarly optimized for the application and or the particular zone in question (e.g., sky, middle, bottom). This vector information can then be encoded and used to generate a set of instructions of how to reproduce that vector AOR, having a particular size, color and location, at a destination end. In still another embodiment, the aforementioned threshold determinations for pixel characteristics (e.g., color, intensity, etc.) can be a function of the application to which the video content is being applied. Video applications which require a higher degree of data preservation would have much lower thresholds for color/intensity difference determinations, while other applications may not need to preserve the integrity of the image as much.

Figure 2A:
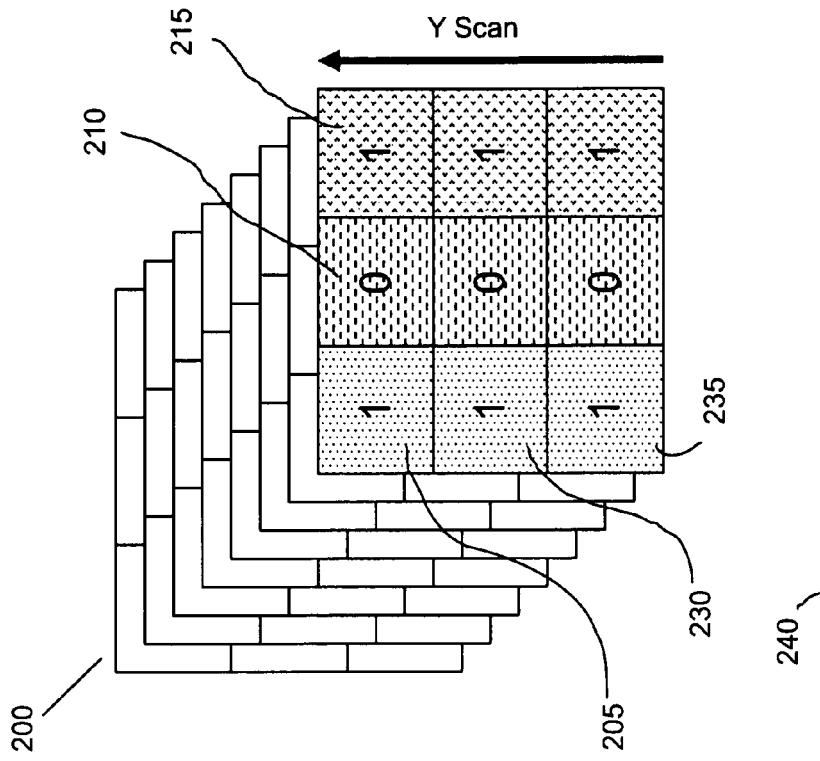
FIGS. 2A-2B depict graphical representations of how a group of pixels may be processed in accordance with the principles of the invention.
Figure 2B:
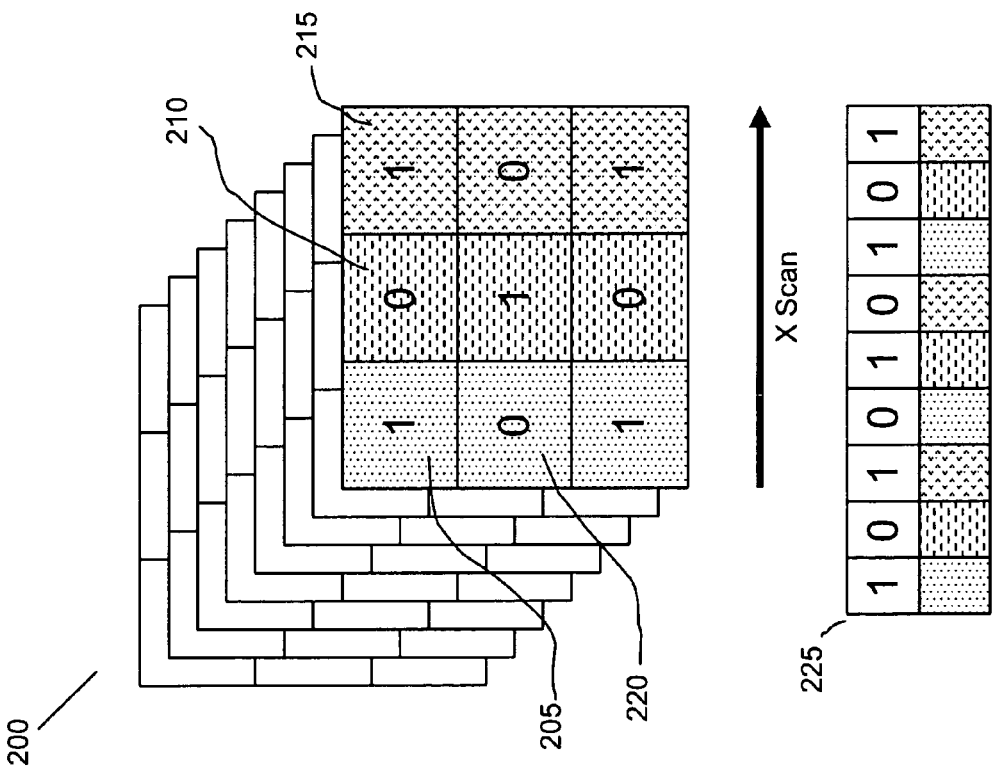

After the fill and vector stages of analysis, there will likely still be more image data which was not captured. For this detailed image data, we can perform a bitmap-level encoding operation in which the individual pixels (or more likely a small group of pixels) are analyzed. Referring now to FIGS. 2A and 2B, depicted is a block of nine adjacent pixels, which is in this case our defined bitmap AOR. In this embodiment, the first column of the bitmap AOR contains three red pixels, the middle column contains 3 blue pixels and the last column on the right contains three green pixels. To process this bitmap AOR according to the approach of FIG. 2A, a horizontal scan process begins with pixel 205 in the upper left hand corner and assigns it an arbitrary logical level value of zero. Its right hand neighbor, pixel 210, would be assigned a different value since its color is different from the previously analyzed pixel. In this case, the value of one is assigned. Continuing left-to-right, pixel 215 would then be assigned back to the arbitrary value of zero since it's color is also different than the previously analyzed pixel. In this manner, the logical zero and the logical one may be used to denote whether the color changed or doesn't change from the last comparison point.

Continuing to scan across the bitmap AOR 200, pixel 220 would then be analyzed and assigned a value of zero since it too has a different color from the last point of comparison. Once the entire AOR 200 is analyzed in this fashion, an octal address 225 representative of the AOR's content (e.g., 1's & 0's) can be generated. Since there are 512 possible binary combinations with a nine-pixel AOR, address 225 will be one of those 512 possibilities and will faithfully reproduce exactly what the structure is inside AOR 200. Each of the 512 possibilities may have a unique algorithm associated with it for processing that unique pixel block.

Referring now to FIG. 2B, depicted is the same bitmap AOR 200, except in this case it is being scanned vertically instead of horizontally. Thus, pixel 205 is again scanned and assigned the arbitrary value of zero. However, instead of moving horizontally to the next pixel 210, the scan is vertical and moves to pixel 230. Since the color is the same in pixel 230 as it is in pixel 205, no color change is indicated and the logical value of zero is again assigned. Similarly, pixel 235 is assigned a value of zero since it too has not changed color since the last point of comparison. The scan process will then continue back up to pixel 210 which does a color change, and hence is assigned a value of one. This continues until the entire bitmap AOR 200 is scanned, as shown in FIG. 2B. The end result will be that the bitmap AOR 200 can be represented with octal address 240 rather than octal address 225. Comparing these two addresses, a determination can be made that octal address 240 should be used rather than octal address 225 since less processing data is involved with octal address 240. Due to the adjacent pixel comparison operation outlined above, octal address 225 necessarily includes data to reproduce nine colors, whereas octal address 240 includes only data necessary to reproduce three colors. Thus, only a three color lookup table (LUT) is required, which is satisfiable by a 2-bit color LUT. In this fashion, the scan direction can be used to minimize the amount of content data required to faithfully reproduce the video content in question.

It should equally be appreciated that, while in the embodiment of FIGS. 2A and 2B only a nine-pixel structure was used, in other embodiments the pixel structure may be much larger (e.g., twenty pixels). With twenty pixels, for example, there are approximately one million possible combinations of processing algorithms. However, many of the processing algorithms will be identical and about fifty percent of the processing algorithms will actually transform into the other fifty percent since the arbitrarily chosen binary value of zero could also be arbitrarily set as the value one.

In another embodiment, adjacent pixel comparisons may also be performed across AORs. For example, once the current AOR (e.g., nine-pixel block) has been processed, the first pixel in the neighboring AOR may then be compared to the last pixel in the current AOR. This allows AOR processing to bridge into larger and larger areas with the least amount of computational overhead to reproduce the AOR structures.

It should further be appreciated that none of the AORs (e.g., fill, vector or bitmap) need be bounded by squares. Rather, other shapes may similarly be used depending on the nature of the content to be processed. In a twenty pixel AOR, for example, it may be desirable to have two rows of ten to optimize horizontal and/or vertical line detail within a single AOR. By way of a none-limiting example, an edge of a building that's extending vertically may most efficiently be processed as a vector AOR that is 2×10 pixels tall (assuming a 20-pixel AOR). This tends to minimize the number of change variables associated with the complex object, and hence reduce the amount of data needed to reproduce the content at a destination point. To that end, one process a reference frame may undergo is to determine the dominant directions of the vectors and orient the AORs to match that in order to minimize the amount of data necessary to reproduce that object.

The above processing of fill, vector and bitmap AORs proceeds until all AORs of all the frames zones have been accounted for. In one embodiment, a scratch pad memory in the encoder can be used to account for the processed AORs and their locations within a particular zone. For example, in the previously-mentioned upper left corner sky zone, assume this zone is zone one. Processing may begin with AOR subzone one of zone one and proceed divisionally from there until further notice. In this fashion, the prolific generation of XY offset addresses can be minimized since the frame is being processed in sequence. In other words, a train of XY pixel blocks can be set up to represent and fill out an entire zone, and then the next zone could be addressed, and so on. Finally, a display map containing the location information for all the various AORs may then be generated in order to duplicate their relative locations on the destination side.

Application-Specific Threshold Testing

Threshold determinations for color, intensity and/or the fill/vector/bitmap processing algorithms can be optimized to specific video applications. In doing color optimization, for example, to reduce the color spectrum (and hence the amount of data needed to reproduce the image), the specific application may be used to inform how much reduction is acceptable. For example, where the application calls for forensic level of video, it may be necessary to absolutely faithfully reproduce the original such that the video content may be submitted in a court of law, or used for distance surgery in the case of a medical application. In this fashion, the amount of data reduction may be throttled up or down as to its video content precision of preproduction as a function of the video application at issue. In the case of security, where the fidelity of the video need not be perfectly pristine, a significant amount of color reduction is possible. In the case of a medical application, however, there is far less latitude with how much color data can be discarded. Thus, a set of processing algorithms for each of the fill, vector and bitmap levels may be developed for each of a plurality of video applications. Not only can the threshold be application specific, but also mode specific when the processing switches from fill, to vector, to bitmap, and so on.

In the case of a security camera application, after the reference frame there may not be any change for an extended period of time. The particular area that is being monitored may be static, for example. In this case it may not be necessarily to transmit a new reference frame every nth frame, but instead the monitoring location could query the source (i.e., the camera) with a command-and-control instruction requesting a new reference frame. In another embodiment, the encoder may continually analyze for delta frame information to trigger transmission in the event of a scene change.

Additionally, in the case where there is extended periods of time with no change, the delta frames would all be null. That is, there would be no delta information to transmit since there are no changes to report. In such a case, the actual monitor at the security end may have a blank screen which remains blank until a delta frame with actual data is received. Thus, in one embodiment when the source image does change, a delta frame may be sent off as a live video feed back to the monitoring facility as a form of alarm, and the alarm may be used to show the changing vectors are occurring, e.g., as someone moves through the secure facility. This may be desirable because prolonged human monitoring of static screens is taxing and difficult.

Master Tables

Continuing to describe reference frame processing, in addition to the RGB video format, the present disclosure is applicable to any other video format as well. In the case of YUV, pixels exhibit both color attributes, as well as intensity attributes. This means that the frame processing operation would require the construction of both color tables, as well as intensity tables for every pixel position. After that, or concurrently therewith, the pixel intensity information may be placed into a master intensity table. Since YUV intensities may be 10-bit values, in one embodiment the frame may be fractionalizes and parsed into a number (e.g., 3) of horizontal sections across the screen (e.g., a top, middle and bottom). This fractionalization may be distinct from the previously-mentioned segmentation of the reference frame into a plurality of zones. Intensity table fractionalization may be performed in order to take advantage of the fact that not all portions of a frame tends to have an intensity level that does not cover the full spectrum of 0 to 100%. For example, with reference to the frame 300 of FIG. 3, the top section 310 of the frame primarily covers relatively bright colors, e.g., blue sky. Since there is almost no black content in a blue sky; there is little need to actually encode black color spectrum or black intensity levels in the top section 310 of the screen into the intensity table, unless of course the scene actually calls for it. Thus, both a master color table and a master intensity table can be dedicated to the top section 310 of the frame (in this example), wherein each of the master tables contain only a subset of the total colors and intensities of the entire frame. Similarly, master color and intensity tables can be constructed for both the middle 320 and bottom 330 sections of the frame in which they again do not include a full color spectrum and again having a compressed regions of luminosity. Thus, in this embodiment, there will be three sets of luminosity to represent 0 to 100% for each of the three exemplary horizontal sections 310, 320 and 330. While in the above embodiment there will be three master color tables and three master intensity tables (for YUV formats), it should equally be appreciated that there may equally be more or fewer.

In another embodiment, luminosity need not be linearly distributed. By way of example, assume that luminosity is an 8-bit code and all eight bits were going to represent percentiles of luminosity. In this case, bit 0 may represent 15%, bit 1 represent the is the next 15%, and so on up to where a full 100% is covered with the 8-bit code. For a given area, this 8-bit code would give 256 possible shades. However, to the human eye the ends of the luminosity that favor black and the ends of the luminosity that favor pure white are less perceptible, and it is not necessary to have the same level of precision as the central area of a luminosity response curve. That being the case, a nonlinear distribution of luminosity in each of the 3 horizontal sections of FIG. 3 can be used in which the extremes of the luminosity curve are deemphasized. In other words, as you approach black (0%) or white (100%) luminosity, color information is lost. Thus, there is little need to reproduce it.

In the case of YUV formatting, master color tables and master intensity tables for each of the different sections may be generated, for a total of six master tables in the present embodiment. In the case of RGB, only master color tables need be generated for each of the various slices. The master tables serve as a master reference lookup for the construction of the end tables (referred to below as indirect LUTs) that would be used for transmission to the destination location.

Figure 3:
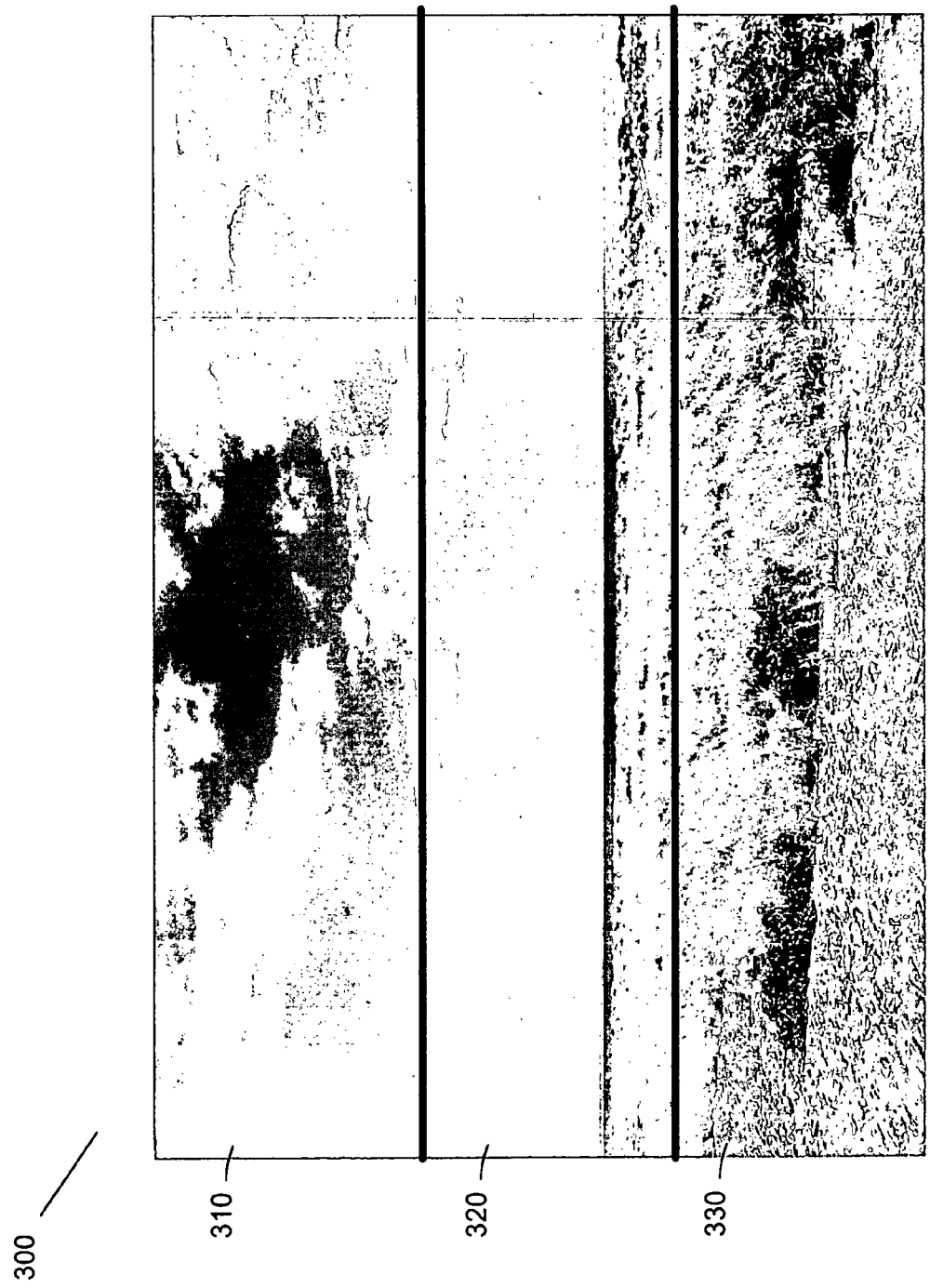
FIG. 3 is one embodiment of a scene which has been segmented for processing in accordance with the principles of the invention.

In generating the master tables, the process would begin with one of the sections of FIG. 3, say the top section 310, and would record faithfully the entire true content range of the intensity into the first master intensity table. The color in that region would also be recorded faithfully and placed in the first master color table. Similarly, the middle section 320 and bottom section 330 would also have fully descriptive tables for each of color and intensity, in the case of YUV, or just color in the case of RGB.

In another embodiment, an intensity offset table may be generated for each of the previously-mentioned sections. Starting with the top section 310 of the frame 300, a mean average value for the intensities in that section may be computed. That value, N, may then be used as a base table offset number, and an intensity offset table may be constructed with plus/minus values off of N, thereby reducing the number of total bits necessary to represent the entire intensity spectrum for a given section.

In another embodiment, the aforementioned mean averaging may be performed according to a non-linear distribution which takes into account the previously-described fact that luminosity need not be linear at the extremes. The end result is that there is a mean value for each section which is set as a base offset number, and which is then used to generate three non-linear offset representations of the intensity spectrums for each of the 3 sections of frame 300, according to one embodiment.

While the above discussion assumes the frame 300 has been segmented into three sections, in other embodiments the frame 300 may be fractured based upon the threshold setting of what would constitute a manageable data set of intensity and/or a manageable data set of color. As the color and intensity values tend to exceed some manageable number of bits, the frame may be fractured into additional sections.

At this point, the master intensity tables contain a relatively large amount of data. Thus, it may be desirable to reduce the size of the master intensity tables to reduce the bit values of any given table to, for example, no greater than 8 bits. For example, each of the aforementioned master tables store 24-bit color and/or intensity addresses. This represents a large amount of data to keep track of. Reducing this value down to 8 bits, for example, would still allow 256 possible colors. Seven bits would allow 128 possible colors, six bits would give 64 colors, and so on. A manageable number of bits can be derived based upon one of those binary values and the bit count set accordingly. For example, if the colors for a given area are greater than 256 (or 128, or 64, or 32, etc), a new table can be created for that area, thereby making the bit count manageable. Moreover, it should be appreciated that the bit count need not be uniform over the entire frame, but instead may be specific to a given section. This is due to the fact that some areas of the screen may have more activity, and hence a more complex color and/or intensity spectrum. Thus, in one area of the frame there may be a bit count of 5, while in an adjacent area the bit count may be 8 depending again on how much activity is occurring. This process again reduces the number of bits of memory addresses necessary to decode the 24-bit colors given in any particular area of the screen.

Indirect LUTs

The previously-described master tables represent a relatively large memory array that may involve up to 8-, 9- or even 10-bit addressing. However, transmission efficiency can be increased by implementing a second tier of indirect lookup tables. To that end, the reference frame can be fractured further down to a lower threshold number of, for example, 3 bits worth of color information on a 3 bit memory lookup table. The 3-bit memory indirect LUT would not, however, contain the color value at a given location, but rather it would contain the address of the corresponding master table where that data can be found. In one embodiment, the processing algorithms defining the previously-discussed AORs may inherently include the 3-bit color indirect LUT location of the address of the master table. On the receiver end of the system, indirect LUTs can be used to efficiently reference color data in the master LUTs.

As will be described in more detail below, once both the master LUTs and indirect LUTs have been transmitted to the receiver location, the primary data traffic would be comprised of the processing algorithm sequences for the delta frames. The processing algorithms would then repetitively reference the indirect LUTs with no additional color information or intensity information needed. In one embodiment, the actual physical location of where a given processing algorithm is to be represented may be pre-recorded as a header, and the header may also dictate how the frame is fractured in a binary horizontal and vertical fashion. Moreover, the same processing algorithm may have several occurrences on the screen, but be referencing a different indirect LUT because of the different screen space. In short, for a given delta frame x, y location there will be a processing algorithm describing the change from the previous frame. That processing algorithm will reference an indirect LUT, which in turn will reference an address in the master table defining the new color or intensity.

In one embodiment, the master LUTs are content specific and may be sent as a preamble to a particular scene progression (e.g., an indoor scene, a love scene, an outdoor, an action scene, etc.). The indirect LUTs may also be sent ahead of their actual usage since, as previously mentioned, the entire first cube of frames (e.g., 30 frames, 60 frames, etc.) is processed and sent together.

Video Data Transmission

As soon as video content is first captured and provided to the encoder, a processing block comprised of a reference frame and N delta frames is stored in one of the encoder's buffers and processed. In one embodiment, the data that comprises the reference frame is the master LUTs for color, intensity or both, the processing algorithms which define the frames AORs, the indirect LUTs that are referenced in the processing algorithms, and the display map that defines how the frame has been fractured.

Given that the processing overhead for video data is so heavily front loaded, it is possible to divide the reference frame data over additional frames. This is due to the fact that a single frame of information is not humanly perceptible. In fact, perceptibility actually begins at about 500 milliseconds, which is about 15 frames of information. In this case, frame two (and possibly additional frames) may not be a classic delta frame, but would rather be a combination reference frame and delta frame. However, for simplicity the present discussion assumes that all of the reference frame data was sent with frame one, and that frame two through N are true delta frames, although this need not be the case.

As will be illustrated below with reference to FIGS. 4A-4B, delta frames contain only that data which actually changed from the preceding frame. Thus, if there was no screen change from say frame 1 to frame 2, no data would need to be sent for frame 2. Instead, on the receiver side, frame 1 would continue to be displayed through the time allotment for frame 2. If there was again no change from frame 2 to frame 3, frame 1 would again continue to be shown for the frame 3 time slot. If, on the other hand, only a particular section changed, then only the processing algorithms defining that particular section would be sent, according to one embodiment. However, in order to determine when there has been a change, a color and/or intensity threshold test may be performed. If the threshold is exceeded, a new set of processing algorithms defining that area of the frame will be transmitted, while the non-changing areas of the frame will not be transmitted. In one embodiment, transmitting only those sections which change may dramatically decrease the amount of data transmission involved in streaming video content to a destination location.

Referring now to FIG. 4A, depicted is a processing cube 400 consistent with the principles of the invention. In particular, processing cube 400 includes reference frame F1, followed by delta frames F2-F30. As illustrated in cross-hatching, all data needed to reconstruct the reference frame F1 is processed, as outlined above, and then transmitted to a decoder at a destination location as part of the processing cube 400. However, only those portions of delta frames F2-F30 which actually change are processed. For example, section 410 of delta frame F29 indicates a portion of the F29 frame which has exceeded the threshold determination for color and/or intensity change, as compared to the preceding frame. As such, the processing algorithms needed to re-create this new section 410 will be sent as part of processing cube 400. Similarly, sections 420 and 430 of delta frame F30 also contain video content which has changed from the immediately preceding frame, the command-and-control processing algorithms needed to describe those changes will similarly be transmitted as part of the data block which defined the processing block 400. In this fashion, no other data representative of frames F29 or F30 need be transmitted, thereby reducing the overall processing overhead and size of processing cube 400.

FIG. 4B depicts another embodiment of the processing cube 400 of FIG. 4A. In this embodiment, however, reference frame F1 has been segmented into six zones F1-1 through F1-6. It should of course be appreciated that reference frame F1 similarly could have been segmented into more or fewer zones. As previously discussed, it may be desirable to divide a frame into manageable zones for increasing the efficiency of subsequent processing. Since certain zones may tend to have higher activity than others, processing biases can be weighted to certain zones over others. Color and/or intensity threshold tolerances may also be set based on which zone is being processed. Finally, master color and/or intensity tables can be constructed on a per-zone basis. It should equally be appreciated that numerous other processing benefits are realizable by segmenting frame data into a manageable number of zones.

Still another aspect of the invention is to adhere to a time budget for a given processing cube. This may be desirable to insure that additional latency is not introduced into the video transmission as the video sequence progresses. As previously mentioned, one aspect of the invention is to process blocks of frames as a processing cube. This means that the processing cube will actually have three dimensions, xyz, where z is a measure of time and xy is an actual frame location for a given point in time z. In order to ensure that a cube's time budget is not exceeded, the data for the frames which comprise the processing cube may be moved as far up as possible to the front of a cube's time budget, optimally leaving a vacuum of no work necessary at the back end of the cubic block. And if there is processing room at the back end of the processing cube, information necessary for the next new reference frame can actually begin to be sent ahead of time.

In the case of a high-action scene, a bandwidth bottleneck may occur. This is because many areas from one frame to the next will be changing, and the processing algorithms needed to re-create all of those changes on the receiver end will need to be transmitted quickly. To alleviate this effect, the quality of the reference frame (or portions thereof) can be adjusted, according to one embodiment. That is, the detail in a high-action scene can be lessened without a perceptible effect to the human eye. As the level of activity increased, the level of detail can be decreased (thereby decreasing the processing overhead) so as not to run afoul of the cube's time budget. Similarly, if there is ample time to send the rest of the cube, then the detail need not be reduced as much or at all.

If the time budget for a given processing cube is set to run out before transmission is complete, the processing parameters can be altered to account for that. In one embodiment, a bias number may be assigned to each of the major zones which comprise the frame based on the perceived level of importance for that particular area. Bias may be based on the amount of activity in a given zone. Thus, the bias for zones with less activity would be lower and the quality of the content for that zone can be downgraded while minimizing the overall effect. Bias is essentially based upon the content.

Now referring to the receiver end, in one embodiment the receiver end includes a decoder which has a dual buffer structure such that a secondary buffer can be loaded with new information for a new processing cube while the primary buffer contains the data for the current processing cube. In addition, the decoder may have both foreground and background color memory map tables, where the foreground table contains the colors that are currently being displayed and the background table is being updated in the background. In one embodiment, a command sequence may be sent that causes the receiver to switch from displaying foreground to displaying background. Again, which ever buffer is not being actively displayed can be updated in the background. In this fashion, as much image information can be packed towards the beginning of the time budget as possible rather than chronologically waiting for the time interval that would normally be assigned for a particular frame.

While in one embodiment, reference frames are updated only once every processing cube (e.g., 30 frames, 32 frames, 60 frames, 62 frames, etc.), they may also be updated more frequently, as may be required by a scene change. On the other hand, if there is a scene of long progression (e.g., longer than the number of frames in the current processing cube), it may be desirable to regenerate the reference frame with exactly the same data as before to protect those viewers that began to access the video stream after the last reference frame was sent.

It should also be appreciated that a particular scene in a movie will have a certain color spectrum and will have a certain mosaic structure of the AORs unique to this particular scene in the sequence that's being played. Thus, in some sense the content is inherently encrypted because if the receiver does not have the correct algorithmic structures, it won't be able to recover the video. In this fashion, video content may be distributed to only authorized receivers.

In one embodiment frames are transmitted with a header, which is part of the packet transmission communications protocol—similarly to the Internet communication protocol. The header may contain information relating to the time/date that the particular frame was sent, where the frame originated from and/or the frame's destination. In another embodiment, the header contains a sequence tag as opposed to a time stamp.

The header information can be used by a decoder on the destination side to be able to re-construct data in the sequence in which it was sent. This may be desirable since data can be sent out of sequence and/or inadvertently received out of sequence.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A method for encoding video data comprising:
    defining a processing cube having a predetermined number of video frames of said video data;
    encoding a reference frame of said processing cube by converting video data representative of said reference frame into command data;
    performing differential pixel analysis between two or more frames of said processing cube; and
    encoding a plurality of delta frames based on said differential pixel analysis.

2. The method of claim 1, further comprising dividing the reference frame into a plurality of fill areas of responsibility (AORs) each of which contains a block of pixels all having a common color, wherein the common color is determined based on a predetermined color difference threshold.

3. The method of claim 2, further comprising dividing portions of the reference frame, which are not otherwise within said plurality of fill AORs, into a plurality of vector AORs each of which contains a block of pixels all having common vector properties, wherein the common vector properties are determined based on a predetermined vector threshold.

4. The method of claim 3, further comprising dividing portions of the reference frame, which are not otherwise within either of said plurality of fill AORs or said plurality of vector AORs, into a plurality of bitmap AORs each of which contains a block of pixels all having common bitmap properties, wherein the common pixel properties are determined based on a predetermined bitmap threshold.

5. The method of claim 4, wherein one or more of said predetermined color difference threshold, predetermined vector threshold and predetermined bitmap threshold is adjusted based on a type of said video data.

6. The method of claim 4, further comprising generating said command data for at least one of said plurality of fill AORs, plurality of vector AORs and plurality of bitmap AORs, wherein said command data is usable to recreate at least a portion of said reference frame.

7. The method of claim 1, wherein said command data includes a display map defining locations of plurality of areas of responsibility (AORs) into which the reference frame has been segmented, one or more master color lookup tables based on a color spectrum for said reference frame, and processing algorithms defining the plurality of AORs.

8. The method of claim 7, wherein said command data further includes one or more master intensity tables and one or more indirect color lookup tables which reference said one or more master color lookup tables.

9. The method of claim 1, wherein performing the differential pixel analysis comprises comparing a current video frame of said processing cube to a preceding frame, and generating a processing algorithm representative of a change between the current frame and the preceding frame.

10. The method of claim 1, wherein encoding the plurality of delta frames comprises encoding processing algorithms representative of changes between two or more frames of the processing cube.

11. The method of claim 10, wherein said processing algorithms reference addresses in a master color lookup table that is generated based on a color spectrum of the reference frame.

12. The method of claim 1, wherein encoding the plurality of delta frames comprises encoding frame-to-frame changes that occur within said processing cube.

13. The method of claim 1, wherein said frame-to-frame changes occur where at least one of a color threshold and an intensity threshold is exceeded.

14. The method of claim 1, further comprising:
    transmitting the video data in the form of a plurality of processing cubes, which includes the processing cube, over a network, wherein each of said plurality of processing cubes includes a corresponding reference frame and a corresponding plurality of delta frames;
    receiving the plurality of processing cubes by a decoder coupled to the network;
    decoding the plurality of processing cubes using the decoder; and
    re-creating said video data using said plurality of processing cubes.

15. A system for transmitting video data comprising:
    a network;
    an encoder coupled to the network to,
        define a processing cube having a predetermined number of video frames, including a reference frame and a plurality of delta frames;
        encode a reference frame of said processing cube by converting video data representative of said reference frame into command data,
        perform differential pixel analysis between two or more frames of said processing cube,
        encode a plurality of delta frames based on said differential pixel analysis; and
    a decoder, coupled to the network, to re-create said video data based, in part, on the processing cube.

16. The system of claim 15, further comprising:
    dividing the reference frame into a plurality of fill areas of responsibility (AORs) each of which contains a block of pixels all having a common color, wherein the common color is determined based on a predetermined color difference threshold;
    dividing portions of the reference frame, which are not otherwise within said plurality of fill AORs, into a plurality of vector AORs each of which contains a block of pixels all having common vector properties, wherein the common vector properties are determined based on a predetermined vector threshold; and
    dividing portions of the reference frame, which are not otherwise within either of said plurality of fill AORs or said plurality of vector AORs, into a plurality of bitmap AORs each of which contains a block of pixels all having common bitmap properties, wherein the common pixel properties are determined based on a predetermined bitmap threshold.

17. The system of claim 15, wherein said command data includes a display map defining locations of plurality of areas of responsibility (AORs) into which the reference frame has been segmented, one or more master color lookup tables based on a color spectrum for said reference frame, and processing algorithms defining the plurality of AORs.

18. The system of claim 15, wherein performing the differential pixel analysis comprises comparing a current video frame of said processing cube to a preceding frame, and generating a processing algorithm representative of a change between the current frame and the preceding frame.

19. The system of claim 15, wherein encoding the plurality of delta frames comprises encoding processing algorithms representative of changes between two or more frames of the processing cube.

20. An encoder for encoding video data comprising:
a processor; and
a memory coupled to the processor, the memory including instruction sequences to cause the encoder to,
define a processing cube having a predetermined number of video frames of said video data,
encode a reference frame of said processing cube by converting video data representative of said reference frame into command data,
perform differential pixel analysis between two or more frames of said processing cube, and
encode a plurality of delta frames based on said differential pixel analysis.

21. The encoder of claim 20, wherein the memory further includes instruction sequence to,
divide the reference frame into a plurality of fill areas of responsibility (AORs) each of which contains a block of pixels all having a common color, wherein the common color is determined based on a predetermined color difference threshold,
divide portions of the reference frame, which are not otherwise within said plurality of fill AORs, into a plurality of vector AORs each of which contains a block of pixels all having common vector properties, wherein the common vector properties are determined based on a predetermined vector threshold, and
divide portions of the reference frame, which are not otherwise within either of said plurality of fill AORs or said plurality of vector AORs, into a plurality of bitmap AORs each of which contains a block of pixels all having common bitmap properties, wherein the common pixel properties are determined based on a predetermined bitmap threshold.

22. The encoder of claim 20, wherein said command data includes a display map defining locations of plurality of areas of responsibility (AORs) into which the reference frame has been segmented, one or more master color lookup tables based on a color spectrum for said reference frame, and processing algorithms defining the plurality of AORs.

23. The encoder of claim 20, wherein the differential pixel analysis includes comparing a current video frame of said processing cube to a preceding frame, and generating a processing algorithm representative of a change between the current frame and the preceding frame.

24. The encoder of claim 20, wherein plurality of delta frames are encode by encoding processing algorithms representative of changes between two or more frames of the processing cube.

* * * * *